United States Patent
Reum, Sr.

(10) Patent No.: US 7,021,918 B1
(45) Date of Patent: Apr. 4, 2006

(54) APPARATUS FOR SHAPING AND PERFORATING A PLASTIC FILM

(76) Inventor: Donald J. Reum, Sr., 1974 Sawgrass Trail, Sebring, FL (US) 33872

( * ) Notice: Subject to any disclaimer, the term of this patent is extended or adjusted under 35 U.S.C. 154(b) by 0 days.

(21) Appl. No.: 11/053,459

(22) Filed: Feb. 7, 2005

(51) Int. Cl.
*B29C 59/04* (2006.01)

(52) U.S. Cl. ............... 425/194; 425/363; 425/388; 425/405.1

(58) Field of Classification Search ............ 425/194, 425/363, 388, 405.1, 471
See application file for complete search history.

(56) References Cited

U.S. PATENT DOCUMENTS

| | | | |
|---|---|---|---|
| 2,809,392 A | 10/1957 | Armstrong | |
| 2,902,718 A * | 9/1959 | Martelli et al. | 425/303 |
| 3,054,148 A | 9/1962 | Zimmerli | |
| 4,151,240 A | 4/1979 | Lucas et al. | |
| 4,181,487 A | 1/1980 | Kessler | |
| 4,541,794 A | 9/1985 | Raley et al. | |
| 4,601,868 A | 7/1986 | Radel et al. | |
| 4,741,877 A | 5/1988 | Mullane, Jr. | |
| 4,830,596 A * | 5/1989 | Neu | 425/388 |
| 4,874,456 A * | 10/1989 | Takagi | 156/471 |
| 4,999,152 A | 3/1991 | Baldwin et al. | |
| 5,034,178 A | 7/1991 | Kinugasa et al. | |
| 5,800,772 A | 9/1998 | Kurasawa | |
| 5,855,090 A | 1/1999 | Reum, Sr. | |
| 6,007,888 A | 12/1999 | Kime | |
| H1927 H | 12/2000 | Chen et al. | |
| 2004/0140047 A1* | 7/2004 | Sato et al. | 156/205 |

* cited by examiner

*Primary Examiner*—Donald Heckenberg
(74) *Attorney, Agent, or Firm*—Albert W. Watkins (57) ABSTRACT

A vacuum forming roll is assembled from a large plurality of radially extensive interlocking segments. Each segment forms a small angular part of a circumference about the roll, and has a relatively small thickness parallel to the longitudinal axis of the roll. The segments are preferably stacked together in an interlocking fashion to form a continuous roll consisting of a plurality of angularly offset circumferential rings. In a preferred embodiment, the segments are formed by manufacturing a small mold designed to form a single segment. This mold may, for exemplary purposes, be an injection mold. The roll mold segments may then be produced quickly and easily using an injection molding process, which, as aforementioned, is efficient for the production of a large number of identical components. The roll mold segments are then assembled to form the roll mold, which is in turn used to shape and perforate a plastic film and thereby manufacture an improved landscape fabric economically. A variety of shapes, geometries and operations for the segments and molds are described.

18 Claims, 7 Drawing Sheets

APPARATUS FOR SHAPING AND PERFORATING A PLASTIC FILM

BACKGROUND OF THE INVENTION

1. Field of the Invention

This invention pertains generally to plastic article shaping apparatus, and more specifically to preform reshaping using vacuum or suction. The preferred reshaping is accomplished at least in part by creating a reduced pressure on at least one surface of a plastic sheet to provide a differential pressure which is utilized as a shaping force. In one preferred manifestation of the invention, the apparatus is used to form landscape fabric from an indeterminate length web, roll, or spool of plastic film.

2. Description of the Related Art

Modern plastic materials have many desirable features and characteristics that make them advantageously suited for many diverse applications. Among the characteristics is the ability to be formed into diverse shapes. One such shape of interest in the present invention is that of a large sheet of very consistent thickness and nearly indefinite length, referred to herein more simply as a web, sheet or film of indeterminate length. When so formed, the plastic will frequently then be rolled about a spool for storage. Many plastic materials are also very consistent in performance throughout the indeterminate length web, frequently possessing substantial strength to weight ratios.

In addition, many of these same plastics are also heat deformable, which permits them to be warmed to a softened state, and then reshaped into substantially different shapes than the original preform. When the plastic may be heat deformed, cooled to a harder or stiffer state and then heat deformed again, this characteristic is known commonly as being thermoplastic. When a plastic material undergoes a significant chemical change during the heating cycle, typically through a chemical cross-linking or the like, and will not readily undergo further deformation, this is referred to as a thermoset reaction.

Other characteristics that are desirable for certain applications include moisture resistance or impermeability, selective coloring and opacity or transparency, an ability to be laminated with diverse materials either prior to or subsequent to additional processing, mechanical and structural integrity, resistance to many different chemicals and fluids, and, when appropriately treated, resistance to sunlight and ultraviolet radiation.

The ability of plastic materials to be readily reformed permits such materials to be produced with very intricate shapes, without having to expend much time and effort producing each individual component. This economy of labor for individual components is achieved by investing initially in a shaped form referred to as a mold, which is then used to impart the mold shape to many different plastic finished products. There are many different techniques used to mold plastics. For exemplary purposes only, and certainly not representing an exhaustive list, plastics may be injection molded, rotationally molded, blow molded, vacuum thermoformed, and so forth. Regardless of the specific technique, these all provide much benefit in production, since a single mold is used to predictably, quickly and repetitively form many plastic components with very little labor or time invested in the formation of each individual component.

The particular material used for the mold will vary depending upon the particular molding technique and type of plastic material being formed. For injection molding processes with plastics having high viscosity even when fully softened, the mold must sustain enormous deformation forces to adequately reshape the plastic. In such instances, the mold will frequently be of very special steel alloys that are particularly hard and durable. However, when vacuum thermoforming relatively softer and more readily formed materials, such as thin or soft thermoplastic sheets, very little force will ever be applied to the mold, nor will the mold be disposed to erode much. As a result, much softer materials may be used. Aluminum and softer steel alloys are materials that are more commonly used to fabricate a vacuum thermoforming mold.

When processing indeterminate length plastic webs, vacuum thermoforming may be used to shape the plastic sheet in a continuous manner as it is unrolled from the spool. In some prior art processes, the sheet is shaped about individual discrete forms, and is then severed into relatively smaller individual components. Such technique is used, for exemplary purposes, in the formation of plastic plates and bowls. However, other processes maintain the indeterminate length of plastic through the process, by unrolling the plastic from the spool, reshaping the plastic in a continuous manner across a roll, and then wrapping the plastic about a take-up spool or the like.

Exemplary of the prior art processes of continuous vacuum thermoforming is U.S. Pat. No. 3,054,148 by Zimmerli, the teachings which are incorporated herein by reference. Zimmerli discloses an apparatus and process for continuously forming an indeterminate length sheet by passing the sheet over a roller that has vacuum selectively applied to only one segment of the roller. This permits the sheet to be held tightly by the roller in the region of vacuum, and consequently be formed in that region. After being formed, the vacuum is released, permitting the sheet to be readily removed from the forming roll. The forming roll is disclosed as optionally being cooled after the sheet is removed and before again rotating back into contact with the sheet.

Another exemplary patent incorporated herein by reference which illustrates enabling technologies, knowledge and the state of the art is U.S. Pat. No. 4,601,868 by Radel et al, entitled "Method of imparting a three-dimensional fiber-like appearance and tactile impression to a running ribbon of thermoplastic film". This patent describes a machine that perforates and debosses continuous film by use of a vacuum drum and heated air stream application. The vacuum level is set to three different levels with the rotational position of the film on the drum. U.S. Pat. No. 4,541,794 by Raley et al, entitled "Apparatus for producing perforated plastic film," and also incorporated by reference, also discloses an embossing and perforating rotating drum system with vacuum varied through the drum position. U.S. Pat. No. 4,741,877 by Mullane, Jr.; U.S. Pat. No. 4,151,240 by Lucas et al; and U.S. Pat. No. 2,809,392 by Armstrong each illustrate additional technologies the teachings of which are incorporated herein by reference.

As will be appreciated, in these prior art forming rolls a hollow cylindrical body is formed by wrapping a perforate sheet or the like into a cylinder. Unfortunately, there is very little flexibility in the geometry of the pattern to be formed, nor, where apertures are desired, in the geometry of and adjacent to the aperture. More recent technologies have attempted to improve upon this limitation, such as by etching or machining three dimensional structures into the perforate sheet. Such production techniques are quite hazardous, expensive, and still only effect microscopic features in the generally two-dimensional sheet. Consequently, this technology has been limited to the forming of primarily flat sheet products, or those products that are dimpled or perforated in repeating pattern corresponding to the holes. In these prior art technologies, the apertures must be normal to the general plane formed by the sheet. Other techniques of vacuum thermoforming using a roll to form a three-dimensional geometry have included wrapping a cloth, fabric or the like upon the roll, about which the sheet good will be formed, thereby creating a three dimensional relief pattern of the cloth in the plastic sheet.

In the field of landscaping, it is known to place indeterminate length plastic sheets upon the ground as a weed barrier. These sheets are commonly imperforate, and consequently block sunlight or plants from passing through. Unfortunately, these imperforate materials prevent moisture and air from passing through also, and so are typically cut in a large perimeter adjacent the plants to permit adequate water and air to reach the plants and soil. Unfortunately, this also permits weeds to grow adjacent the plant. Similar competing technologies use non-woven plastic fabrics as barrier films. These fabrics are designed to allow moisture and air to pass through the film, but prevent larger plants from passing through. Unfortunately, plant roots are sometimes extremely fine and also pass through the non-woven fabrics, enabling a plant to undesirably grow on top of the fabric while degrading the effectiveness of the fabric. These non-woven fabrics are additionally somewhat more expensive and less durable than the imperforate sheets or films of plastic.

An improved landscape fabric has been disclosed in U.S. Pat. No. 5,855,090 by the present inventor, the contents which are incorporated herein by reference. The landscape fabric disclosed therein has controlled perforations formed along vertical walls within the fabric. Drainage channels conveniently direct moisture through the perforations, while sunlight is generally blocked, owing to the generally vertical nature of the perforate walls. However, and as is apparent in the illustrations, the fabric must be formed with relatively complex three-dimensional patterns into an indeterminate length film. While other manufacturing techniques may be used in the production of the fabric disclosed therein, it will be recognized by those skilled in the art of plastics manufacturing that vacuum roll forming is substantially less expensive, where a suitable form may be designed. Unfortunately, the fabrication of a vacuum roll form using prior art techniques such as described by the prior art referenced herein above and incorporated herein by reference requires substantial, almost astronomical expense. This is due to the substantial machining required of the form, whether machined mechanically or chemically. The height differential intrinsic to this improved landscape fabric is substantial enough that a great deal of material must be removed from the form. The prior art technique to achieve this removal is substantial, very repetitive machining. Consequently, the cost of the tooling required for the production of large volumes of the improved fabric has prevented substantial adoption of the fabric within the landscaping industry to date.

SUMMARY OF THE INVENTION

Exemplary embodiments of the present invention solve inadequacies of the prior art by providing a vacuum forming roll which is assembled from a large plurality of radially extensive interlocking segments. Each segment forms a small angular part of a circumference about the roll, and has a relatively small thickness parallel to the longitudinal axis of the roll. The segments are preferably stacked together in an interlocking fashion to form a continuous roll consisting of a plurality of angularly offset circumferential rings. In the preferred embodiment, the segments are formed by manufacturing a small mold designed to form a single segment. This mold may, for exemplary purposes, be an injection mold. The roll mold segments may then be produced quickly and easily using an injection molding process, which, as aforementioned, is efficient for the production of a large number of identical components. The roll mold segments are then assembled to form the roll mold, which is in turn used to fabricate improved landscape fabric economically.

In a first manifestation, the invention is a mold segment adapted for juxtaposition with a plurality of identically shaped mold segments, each angularly offset from adjacent segments by a first angular offset to thereby form a mold. Each mold segment has a first major surface forming a first face, a second major surface generally parallel to the first major planar surface that forms a second face opposed to the first face, at least one minor surface bounding the first and second faces, a first plurality of teeth extending normal to the first major surface, a second plurality of teeth extending normal to the second major surface, at least two vacuum conduits passing between the first and second major surfaces, and a plurality of vacuum channels interspersed with the teeth, each of the plurality of vacuum channels coupling at least one of the vacuum conduits to the at least one minor surface.

In a second manifestation, the invention is a method of manufacturing and using a vacuum thermoforming mold. According to the method, a mold is fabricated to have a shape defining surface. A plurality of segments are formed through contact with the shape defining surface. Ones of the plurality of segments are arranged in contact with and offset with respect to adjacent ones of the plurality of segments to thereby assemble a vacuum form. Differential pressure is selectively applied through the vacuum form while passing a plasticized film adjacent thereto, to thereby reshape and perforate the plastic film.

In a third manifestation, the invention is a vacuum thermoforming mold roll extending longitudinally about a central axis and operative with a plastic film to reshape and perforate the film. According to this manifestation, the improvement comprises a plurality of identical mold segments, each one angularly offset about the central axis from adjacent ones of the plurality of identical mold segments and coupled therewith to form a circumferential ring which defines at least one portion of a three-dimensional exterior surface about the mold roll and which further defines at least in part one vacuum port passing through the mold roll to the exterior surface.

OBJECTS OF THE INVENTION

A first object of the invention is to form a large mold from smaller mold segments. A second object of the invention is to configure the mold segments to be manufactured by molding. Another object of the present invention is to enable the production of precise and detailed three-dimensional geometries from ordinary plastic sheet. A further object of the invention is to provide a plurality of ports for pressure control, which may in turn be used for the ejection of residue when required. Yet another object of the present invention is to control the temperature of the mold segments as needed for the fabrication of a particular thickness and composition of plastic sheet. A further object of the invention is to overlap and stagger all end-to-end joints between mold segments, to thereby form an interlocking between components which substantially increases mechanical strength within a cumulative collection of segments such as a roll or full mold.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

In accord with the teachings of the present invention, and to illustrate the concepts encompassed therein, preferred embodiment single mold segment 1 is illustrated in FIGS. 1–4 and 7. A preferred embodiment roll 200 which combines a plurality of adjacent and angularly offset circumferential rings 201, each circumferential ring 201 made up of a plurality of like single mold segments 1, is illustrated in FIGS. 5, 6 and 8.

Figure 1:
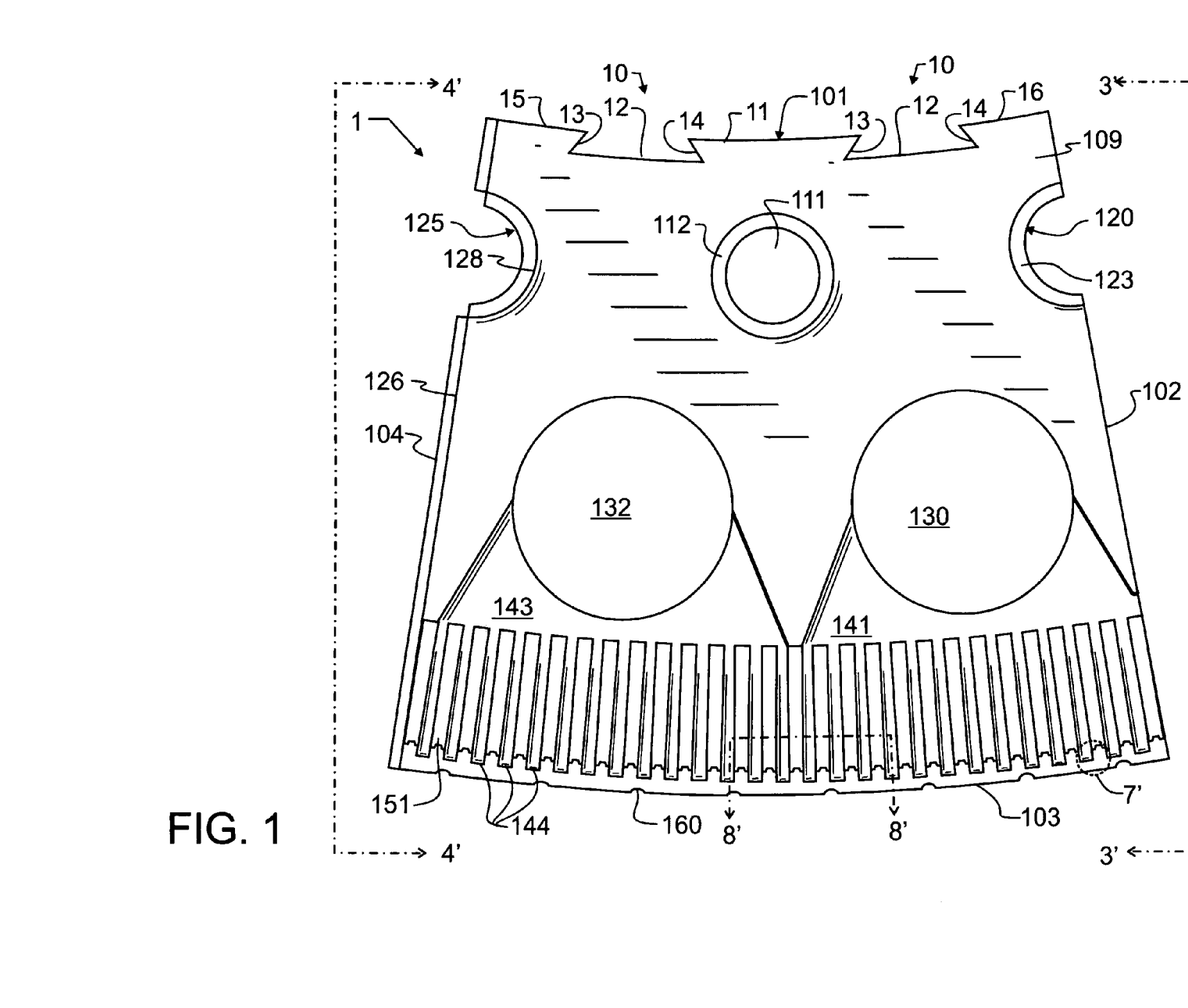
FIG. 1 illustrates a preferred embodiment single mold segment designed in accord with the teachings of the invention from front plan view.
Figure 2:
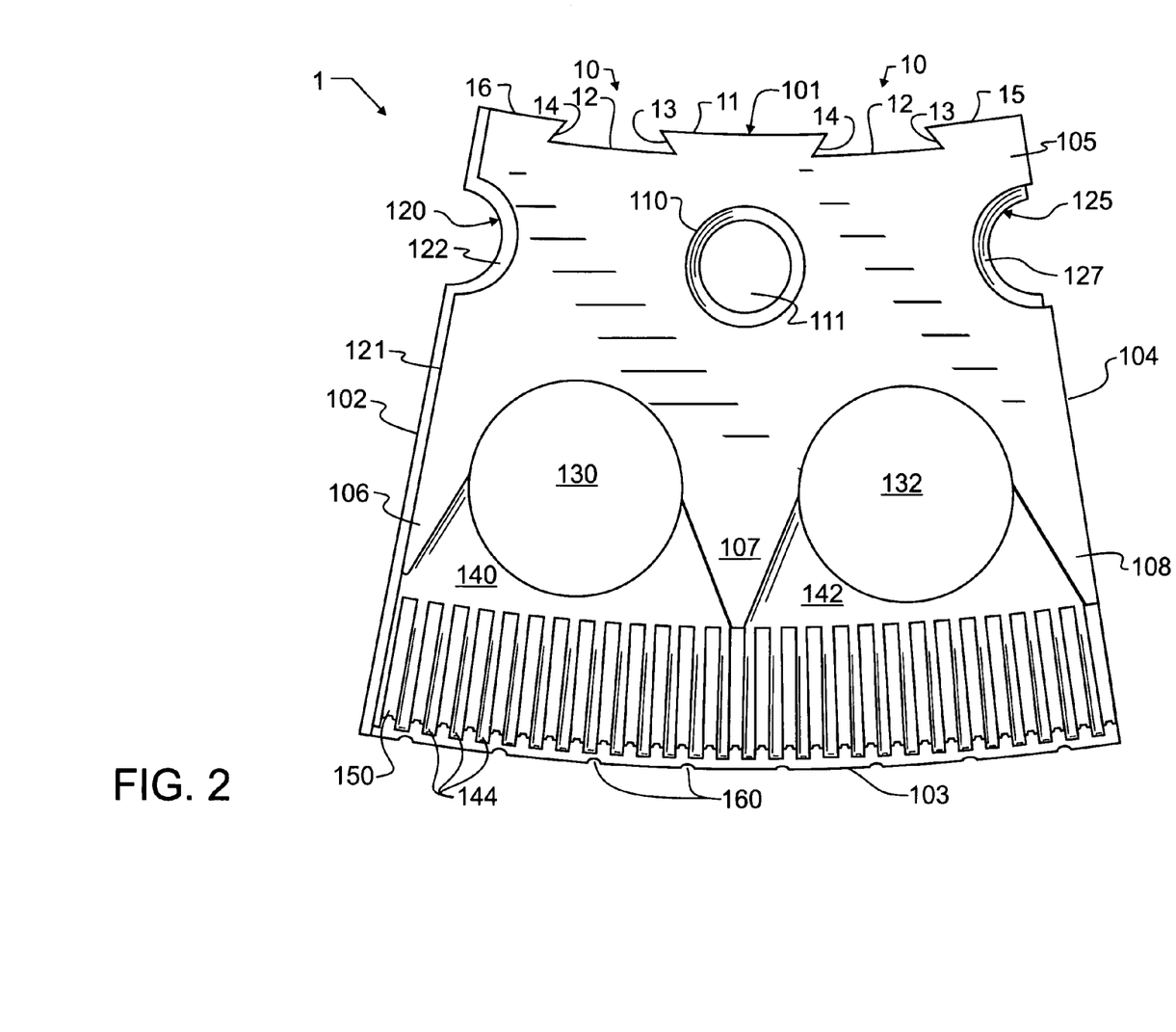
FIG. 2 illustrates the preferred embodiment single mold segment of FIG. 1 from back view.

Segment 1 has a first major planar surface 109 forming a first face and a second parallel major planar surface 105 forming a second opposed face. Central edge 101 forms a first minor surface bounding mold segment 1, and includes several trapezoidal notches 10 therein, described in greater detail herein below. Exterior edge 103 forms a second minor surface, and composite edges 102, 121 and 104, 126 form the third and fourth minor surfaces, respectively. These four minor surfaces together with the two major surfaces 105, 109 generally define the exterior space occupied by a single mold segment.

Figure 3:
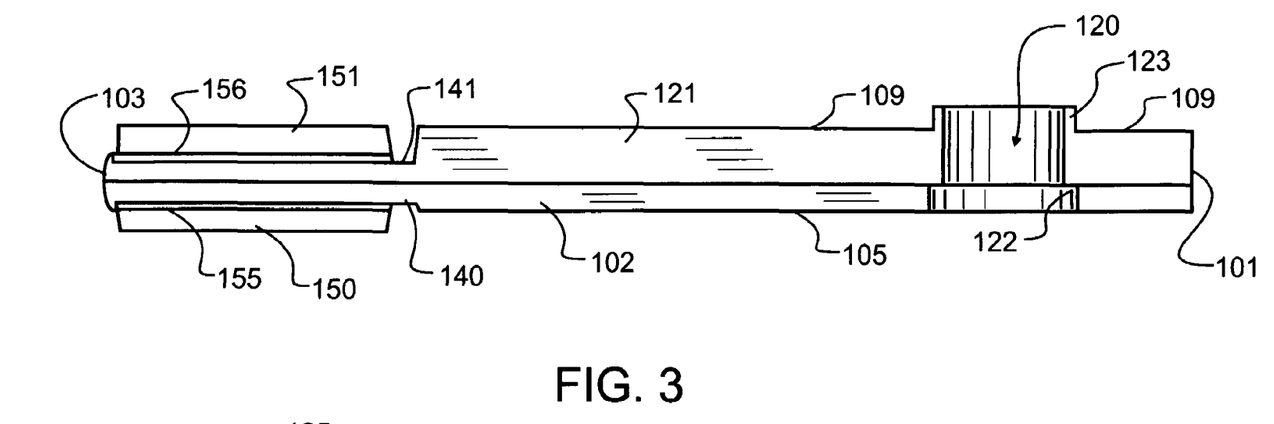
FIG. 3 illustrates the preferred embodiment single mold segment of FIG. 1 from side view as designated by line 3' in FIG. 1.
Figure 4:
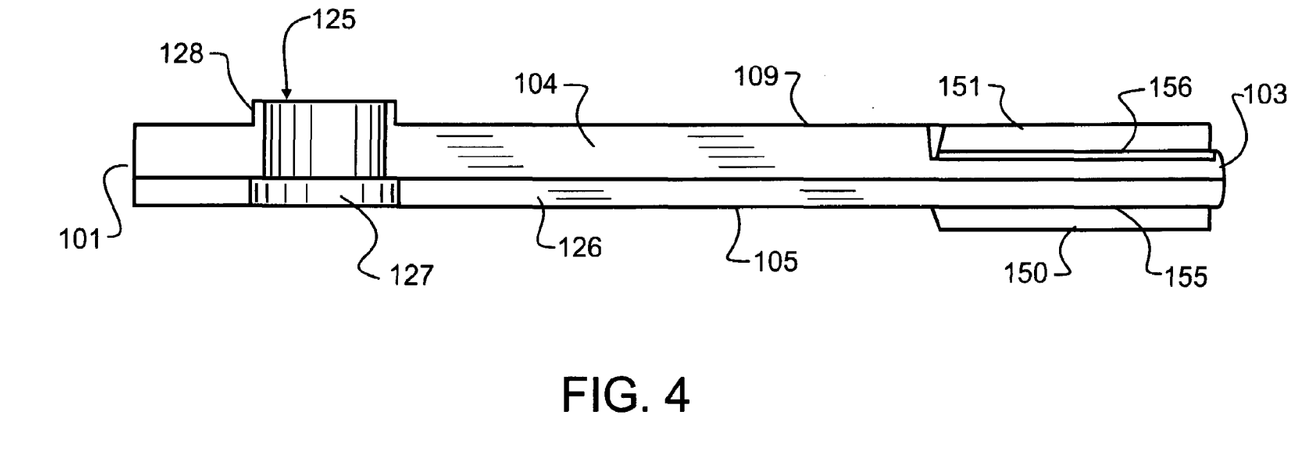
FIG. 4 illustrates the preferred embodiment single mold segment of FIG. 1 from side view as designated by line 4' in FIG. 1.

However, and as may be apparent from FIGS. 3 and 4 for example, there are still several features which exist in relief beyond the surfaces just detailed. More particularly, drainage teeth 150, alignment semicircles 123, 128, and alignment circle 112 are each raised above the adjacent surfaces 105 and 109. These protruding features are designed to engage with adjacent and angularly offset segments to ensure proper physical alignment and relation therebetween. Drainage teeth 150 align and engage with drainage teeth 151, alignment semicircles 123, 128 engage with ledge 110, and alignment circle 112 engage with ledges 122, 127. Consequently, all protrusions from segment 1 are designed to engage with mating depressions formed in segments from adjacent circumferential rings 201, each segment which is identical in construct to segment 1.

Figure 5:
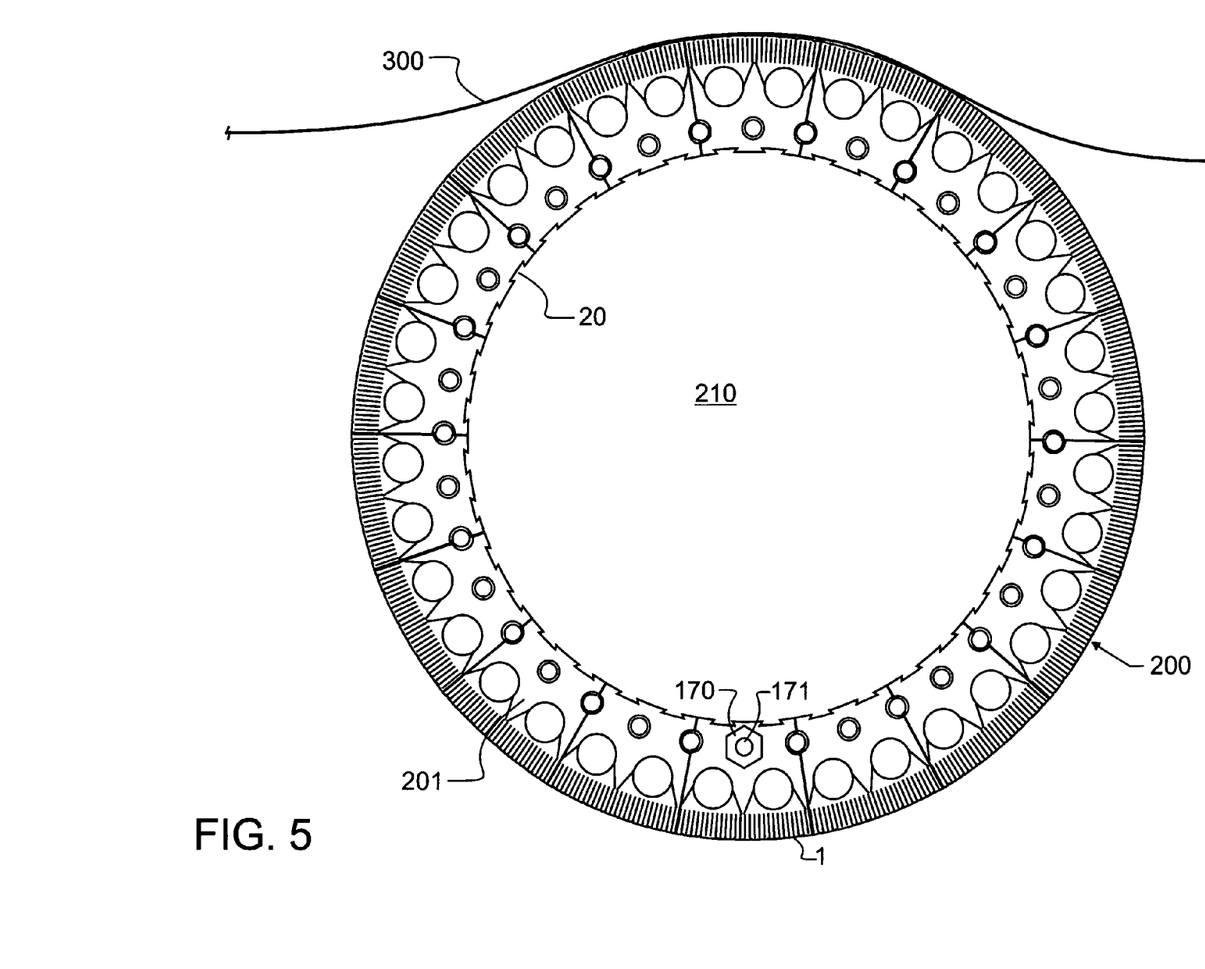
FIG. 5 illustrates a preferred embodiment mold roll from simplified side view illustrating a functional combination of a plurality of preferred embodiment single mold segments.
Figure 6:
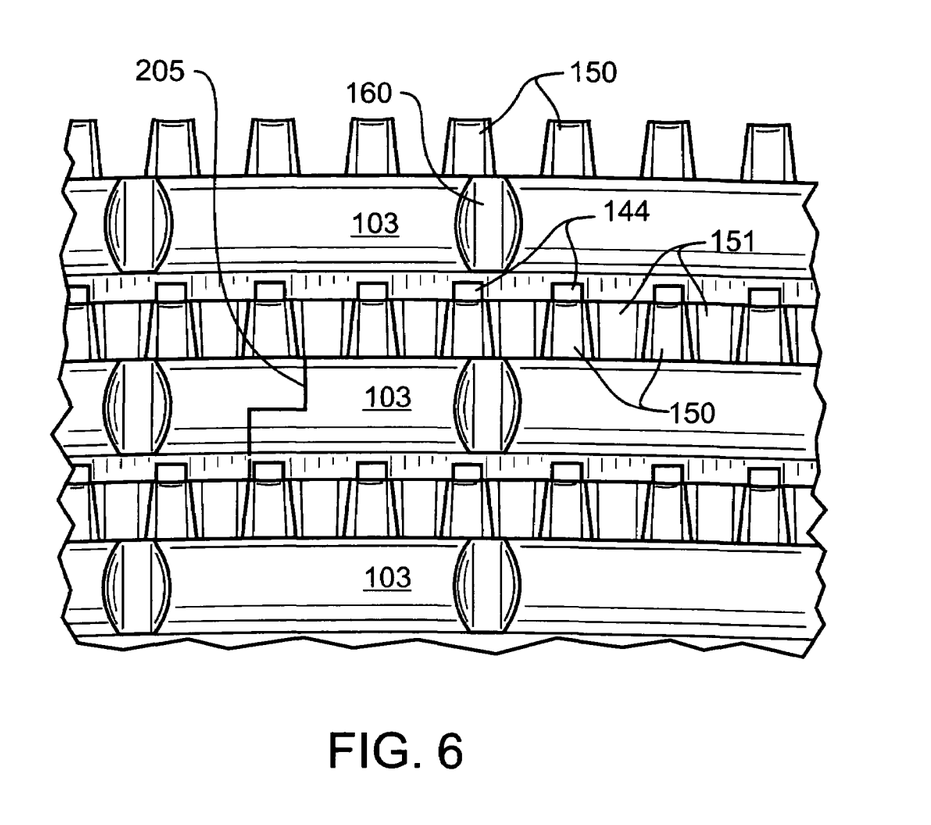
FIG. 6 illustrates a magnified sectional projected view of one end of the outer circumference of the preferred embodiment mold roll of FIG. 5.

References to angular offset herein refer to various angular orientations about the longitudinal axis of roll 200, which is at the center of circumferential ring 201 and may, for exemplary purposes, define the axis of rotation of roll 200 about core 210 in FIG. 5. It will be apparent from FIG. 5 that each segment 1 illustrated therein is angularly offset from adjacent segments about the longitudinal axis. The placement of sufficient segments 1 adjacent to each other will form an entire circumferential ring 201.

While circumferential ring 201 fully encircles the longitudinal axis of roll 200, ring 201 only extends in the direction of the longitudinal axis a distance equal to the thickness of segment 1. In the preferred embodiment, for exemplary purposes only and not limiting the invention thereto, a segment 1 may extend several inches radially out from roll 200, and several inches about the circumference. However, the thickness of segment 1, which is the distance between major planar surfaces 105 and 109, may only be a fraction of an inch. A complete mold may typically extend several feet in the direction of the longitudinal axis of roll 200. Therefore, in assembling a complete mold from segments 1, a large number of circumferential rings 201 will be held adjacent each other. Most preferably, and as is evident from inspection of FIG. 6, each circumferential ring 201 will be angularly offset from adjacent circumferential rings 201' and 201". The three adjacent rings 201, 201' and 201" are offset such that a seam between segments 1 in ring 201, designated therein as rabbet 205, does not align with the seams, or rabbets 205 in adjacent rings 201' and 201". The angular offset between adjacent circumferential rings 201 helps to inherently ensure the integrity of a large stack of segments 1 as would be used in the assembly of an entire roll 200, by ensuring that the seams between adjacent segments 1 within one circumferential ring 201 do not line up with similar seams in either of the adjacent and otherwise identical rings 201.

To further secure a large plurality of segments 1, such as illustrated for exemplary purposes in FIG. 5, rods 170 may be provided that pass through openings 111, 120, 125 that are, for exemplary purposes, secured with nuts such as nut 171. The use of rods and nuts is purely for exemplary purposes. However, the provision of removable fasteners of suitable type is most preferable, since individual segments may be removed, cleaned, replaced or the like readily. Nevertheless, in situations that do not require such removal or replacement of individual segments, it will be understood that segments 1 from adjacent circumferential rings 201 may be permanently fastened as well, using one of the myriad of coupling techniques known. For exemplary purposes only, and not limiting thereto, permanent methods may include adhesives, interlocking permanent mechanical couplings, or other technique.

To permit edge to edge coupling between segments 1, a groove is formed on each edge, producing the composite edges 102, 121 and 104, 126. This edge coupling within a single circumferential ring is illustrated in FIG. 6 as rabbet 205. Rabbet 205 helps provide positive engagement between circumferential segments, and helps to block air channels. Those skilled in the art will recognize that other types of joints may be formed between segments which will offer similar benefit. Nevertheless, the rabbet is preferred for simplicity and effectiveness.

Vacuum or pressure differentials with respect to ambient may be generated and then coupled to individual circumferential rings 201 through vacuum conduits 130, 132 that pass entirely through segment 1. Most preferably, and using the configuration illustrated in the figures, angular offset between adjacent circumferential rings 201 is sufficient to align vacuum conduits 130 in one ring 201 with vacuum conduits 132 in an adjacent ring 201. Consequently, these vacuum conduits will take on an extended cylindrical configuration through an entire roll 200.

Within each segment, vacuum conduit 130 extends into vacuum ports 140, 141, each which are depressed with respect to adjacent surfaces 105, 109 and bounded by v-shaped extensions such as 106, 107 of surface 105 to thereby ensure adequate passage of air or gasses there through. Similarly, vacuum conduit 132 extends into vacuum ports 142, 143, which are similarly depressed from surface 105 and bounded by v-shaped extensions such as 107, 108 of surface 105. Vacuum ports 140–143 in turn are coupled to vacuum channels 144, which are also slightly depressed relative to surfaces 105, 109. This tapering from large conduits into substantially smaller vacuum channels 144 substantially regulates and ensures uniform vacuum distribution, which is very important for the proper formation of perforations within film 300.

Most preferably, and as best illustrated in FIG. 8, when a plurality of segments 1 are stacked and angularly offset between adjacent circumferential rings 201, one-half of drainage teeth 150 from one segment 1 will overlap with one-half of drainage teeth 151 from an adjacent segment 1 from an adjacent circumferential ring 201. The overlap between teeth will most preferably extend such that drainage teeth 150 from one segment 1 will terminate adjacent or at a level parallel to major surface 109 of the adjacent segment 1. Since vacuum channels 144 are cut into surfaces 105 and 109, drainage teeth 150 and 151 will not block the passage of gasses through these channels. Consequently, gasses may be drawn into or blown out of roll 200 by passing through vacuum conduits 130, 132, vacuum ports 140–143, and vacuum channels 144. This arrangement may also be viewed from the illustration of FIG. 6, which is at a projected view tilted sufficiently to make vacuum channels 144 adjacent surface 109 visible, while exterior edge 103 blocks the direct view of vacuum channels 144 adjacent surface 105.

As may also be apparent in FIG. 6, since vacuum channels 144 extend radially outward farther towards edge 103 than drainage teeth 150, 151, the ends 145 of these channels will be exposed directly to a plastic film 300 that may be passing about roll 200. Consequently, with sufficient vacuum applied through the various vacuum conduits, ports and channels, plastic film 300 will be deformed and perforated adjacent the exposed ends 145 of vacuum channels 144. Since in some instances small fragments of plastic film 300 may inadvertently be drawn into channels 144 during perforation, it will be desirable in some designs to arrange pressures within the various vacuum components that are greater than ambient, preferably during angular orientations that are not exposed to plastic film 300, which will in turn cause air or other gas to exit through vacuum channels 144 and thereby blow out any film fragments. Additionally, during these orientations away from plastic film 300, the gas passing through these various conduits, ports and channels may further be temperature controlled to maintain most desirable temperatures at the time of contact with film 300. Most preferably, core 210 is also temperature controlled, to prevent mismatched temperatures between roll 200 and film 300 from interfering with proper forming of film 300. Such known techniques for temperature control, for exemplary purposes only and not limiting thereto, may include the passing of gasses at particular temperatures and also liquid mists or vapors, such as steam or the like, as well.

Figure 7:
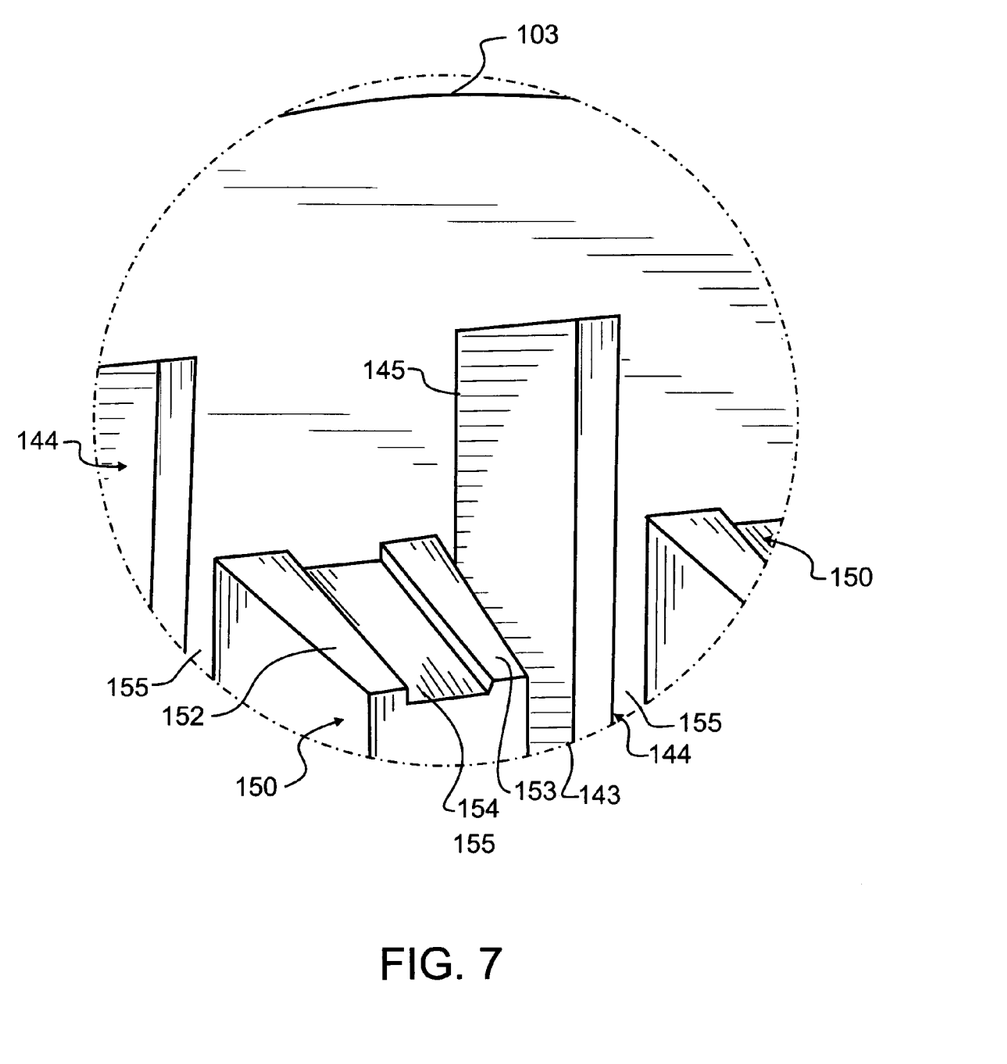
FIG. 7 illustrates a magnified sectional projected view of one of the tooth and groove combinations found within the preferred embodiment single mold segment of FIG. 1 and taken on line 7' therein.
Figure 8:
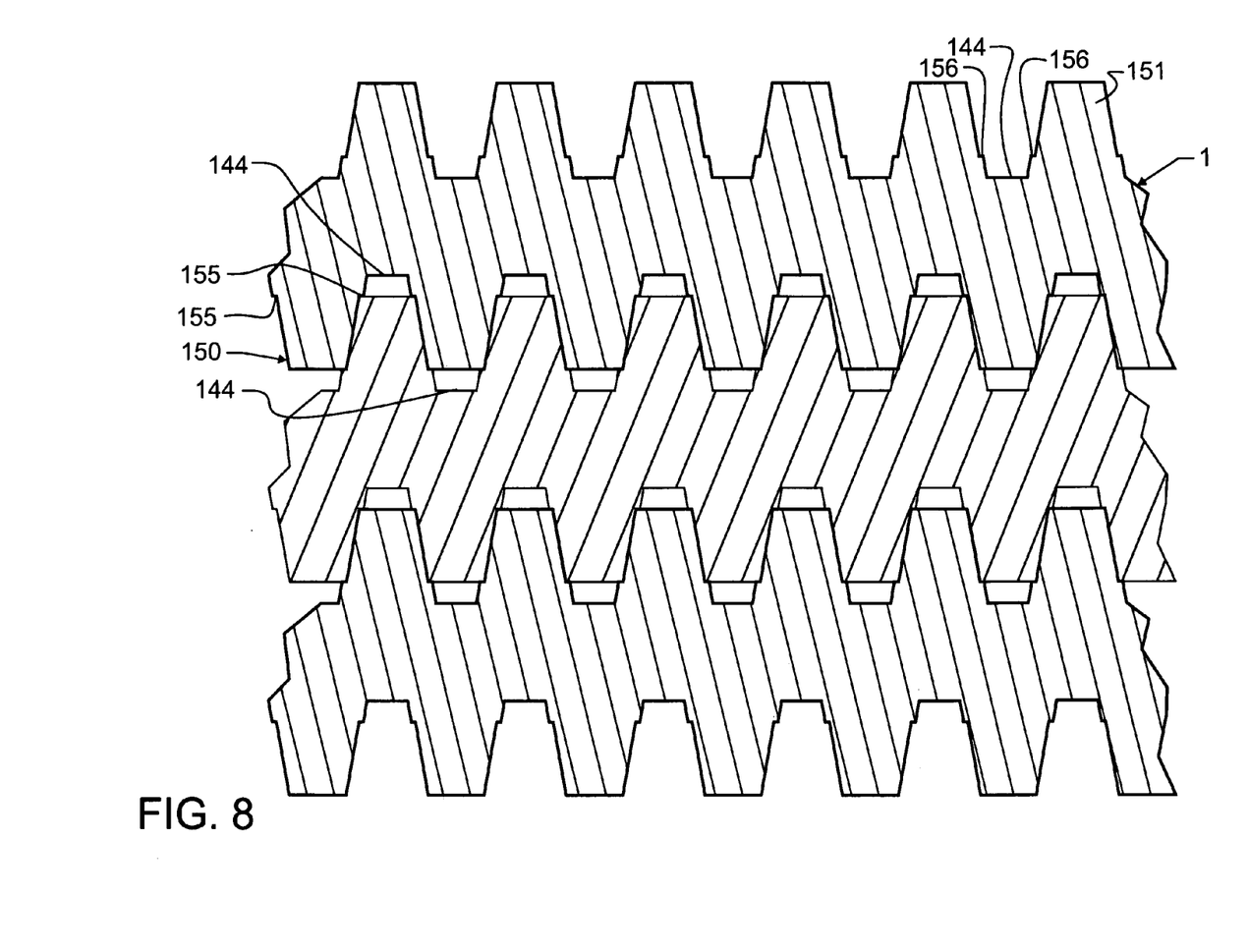
FIG. 8 illustrates a cross-sectional view of interlocking adjacent teeth taken along section line 8' of FIG. 1, and with several like segments stacked adjacent to each other as illustrated in FIG. 6.

A substantially magnified sectional view of an end of tooth 150 and vacuum channel 144 is shown in FIG. 7, which further illustrates the preferred arrangement. As visible therein, a top edge of tooth 150 includes two raised members 152, 153 and a valley 154 therebetween. Drainage teeth 150, 151 are so named since they are used to form the alternating drainage channels in plastic film 300 that directly couple to the perforations ultimately formed by vacuum channels 144 adjacent channel ends 145. The drainage channel in plastic film 300 is formed by the valley 154, with edges created by raised members 152, 153. Most preferably, there is a slight slope that will, in the landscape application, direct water within the drainage channels towards the perforations. In the preferred embodiment, there are 256 of these perforations formed within each square inch of landscape fabric. The slope will be understood to be slight, but very beneficial in such application. In a preferred embodiment film, the perforations will be sufficiently small that water will only pass through where the film is in ground contact, and will otherwise be retained by surface tension.

To further control the rigidity of roll 200, drainage teeth 150, 151 are wider adjacent the base than at the peaks, designated in the figures by regions 155, 156 at the respective bases. Consequently, when adjacent segments 1 from adjacent circumferential rings 201 are engaged with each other, drainage teeth 150 will be interleaved with drainage teeth 151 as shown in FIGS. 6 and 8. Moreover, with the slight flares of regions 155, 156 at the base of drainage teeth 150, 151 and visible in FIGS. 3, 4, 7, and especially FIG. 8, these interleaved teeth will positively engage with each other and not pass farther between each other when, for example, drainage tooth 150 encounters region 156 and drainage tooth 151 encounters region 155.

While edges 103 will form elevated ridges that add some rigidity to film 300, some flexibility to follow varying landscapes is preferred. Such flexibility is achieved in the preferred embodiment with the provision of grooves 160 which will act as hinging members transverse to the direction of edges 103 within plastic film 300. The frequency of grooves 160 will be determined by the inherent flexibility of film 300, which is controlled by such factors as composition, thickness, intrinsic stiffness, temperature, and the like. These grooves 160 will not only benefit the function of finished landscape fabric during application and use, but will aid in the manufacture. The flexibility obtained in film 300 therefrom will aid in the removal of film 300 from roll 200 during vacuum forming as well.

The preferred embodiment segments 1 are manufactured by first fabricating a mold and then forming a plurality of segments 1 into the shape of the mold. Next, ones of the plurality of segments 1 are arranged in contact with adjacent segments 1, and angularly offset with respect thereto, into circumferential rings 201 that, in plurality, form a vacuum forming roll 200. This simple method of molding segments and assembling them permits the mold to include vacuum channels formed between adjacent segments. These channels may consequently extend through the mold radially and exit tangentially or at any other angle relative to the mold surface. This arrangement is not possible in the prior art vacuum roll technology which utilizes sheet metal as the forming surface. Further, to manufacture such a mold from thicker stock is extremely difficult and expensive, and, when the mold surface area is too great, becomes practically impossible. Consequently, the present invention has much application to the formation of molds of all geometries, where differential pressures are to be applied at unusual angles, offsets or locations relative to the outer surface of the mold.

Differential pressure is selectively applied through vacuum forming roll 200 to a plastic film 300, which is subsequently molded or formed into landscape fabric, in the preferred embodiment. Consequently, in the preferred embodiment, a plurality of molded segments in turn form the mold for vacuum molding landscaping fabric. The production of a small mold for injection molding small segments such as segment 1 is of relatively low cost, and, owing to the preferred geometry and teachings illustrated herein, the assembly of a large plurality of such segments 1 into a roll 200 is also relatively simple and of low cost. Consequently, a relatively precise and large vacuum mold capable of forming very large three-dimensional features in a plastic film 300 may be fabricated for surprisingly low cost. The material used to form segments 1 will be any material deemed suitable for the temperatures and forces expected to be encountered during the operation of roll 200. With appropriate ventilation through the various conduits, ports, and channels, plastic mold segments may even be used. It will be understood that where plastic is used in the formation of individual segments 1, that such plastic will be a relatively high temperature plastic suitable for use at the temperatures required by the material of film 300. In the preferred embodiment, polycarbonate has been implemented, but it will be understood that there are many other suitable high-temperature plastics. It will also be understood that other materials may be used for the fabrication of mold segments 1, including but not limited to aluminum and other metals and composites.

Most rolls are presently fabricated from ferrous-based materials. To keep tooling and production costs at a minimum, segments 1 are preferably fabricated from materials such as plastics, aluminum and the like that have either lower melting or lower molding temperatures than usually associated with ferrous-based materials. Unfortunately, many of the materials preferred for segments 1 have thermal expansion coefficients which are very different from, and generally much larger than the thermal expansion of a ferrous-based roll 200. Therefore, it is possible for circumferential rings 201 to separate from roll 200 when roll 200 and rings 201 are heated. Since heating is a normal part of most typical sheet forming processes, it is desirable to provide a way to ensure that segments 1 stay in direct contact with roll 200, regardless of temperature.

To ensure such contact, preferred embodiment segments 1 are provided along central edge 101 with trapezoidal notches 10, as already referenced herein above. Each trapezoidal notch 10 includes an inner flat surface 12. Two faces 13, 14 are angled from surface 12. Between notches 10 is an inner circumference 11 and along an arc common with circumference 11 are additional segments 15 and 16. Notches 10 are configured in a complementary way to engage with protrusions 20 which protrude from roll 200. Notches 10 and protrusions 20, when engaged with each other as illustrated for exemplary purposes in FIG. 5, form a dovetail joint, which ensures a very strong connection therebetween. Those skilled in the art will recognize that other techniques for coupling segments 1 to roll 200 may be provided, or that where thermal expansion mismatch is unimportant or negligible, such coupling between segments 1 and roll 200 might not even be used.

The plastic film referred to herein may typically belong to the family of thermoplastic materials. While plastics are frequently grouped into classifications referred to as thermoplastic and thermoset, it will be understood that some thermoset materials are also capable of limited thermal shaping or deformation, and under some circumstances may then be included in the collection of materials suitable for use with the present invention. It is also known that plastic materials may be softened through other techniques than heat, and may likewise become rigid using other techniques than cooling. Where such techniques will be applicable to the present invention, they are likewise understood to be incorporated herein, and may in some instances eliminate the need for heat to plasticize film 300. As will be recognized by those familiar with modern plastics, a very wide and diverse array of materials are available that would be suitable for use as film 300 in association with the preferred apparatus and methods disclosed herein.

Furthermore, while the preferred embodiment roll 200 is configured to fabricate landscape fabric, those skilled in the art will, upon a reading of the present disclosure, fabricate other three-dimensional molds for use in the manufacture of other shapes and objects from film 300 or the like. Even the formation of rolls or external geometries other than cylindrical may be fabricated. For exemplary purposes only, and not limited thereto, the exterior of roll 200 may be that of a plurality of flat faces about core 210, and the forming of film 300 may be discontinuous or step-wise, if so desired. In an even further application of the present invention, it will be understood that an entire roll may, in some instances, be undesirable. In such instance, a segment of a roll or even a simple cube, parallelepiped, or other suitable shape or geometry only limited to the design of the segment using the present teachings may be formed as the mold. Such mold may have a generally arcuate, flat or any other shaped surface of contact with plastic film. Such geometries may similarly be operated continuously or in one at a time, step-wise or reciprocating operations. Most noteworthy however is the ability of the present invention to form a three-dimensional geometry, port vacuum throughout the geometry, and consequently enable perforations or formations on a vertical or any other surface in that three-dimensional geometry. In similar fashion, core 210 may likewise take on many very diverse shapes other than the cylindrical geometry illustrated herein, including flat, bar, parallelepiped, or any other suitable forms.

For the purposes of the present disclosure, the references to vacuum herein will be understood to simply be references to pressure differentials between different regions, and that such pressure differentials may take on any suitable magnitude or sign. In other words, a particular vacuum port may carry either a pressure less than ambient or greater than ambient, and may further create a pressure across film 300 or a portion thereof which exceeds one atmosphere of pressure. The particular technique used to create such pressure differentials is unimportant to the present invention, but several such techniques are known in the industry and available, such as are used, for exemplary purposes only, in the forming of oriented plastics, some which are known to require both careful temperature control and more than one atmosphere of pressure.

Consequently, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

What is claimed is:

1. A mold segment adapted for juxtaposition with a plurality of identically shaped mold segments, each of said plurality angularly offset from adjacent segments by a first angular offset rotated about a point of rotation to thereby form a mold, said mold segment comprising:

a first major surface forming a first face;
a second major surface generally parallel to said first major planar surface and forming a second face opposed to said first face;
at least one minor surface bounding said first and second faces;
a first plurality of teeth extending normal to said first major surface;
a second plurality of teeth extending normal to said second major surface;
at least two vacuum conduits passing between said first and second major surfaces; and
a plurality of vacuum channels interspersed with said first and second plurality of teeth, each of said plurality of vacuum channels coupling at least one of said vacuum conduits to said at least one minor surface.

2. The mold segment of claim 1 wherein said at least two vacuum conduits are offset by one-half said first angular offset with respect to said point of rotation.

3. The mold segment of claim 1 further comprising alignment semicircles protruding from at least one of said first and second major surfaces.

4. The mold segment of claim 1 wherein said first plurality of teeth from said mold segment are operable, when stacked and angularly offset from a similar mold segment, to overlap with said second plurality of teeth from said similar mold segment and further define said plurality of vacuum channels.

5. The mold segment of claim 1 further comprising angularly repeating alignment features which operably permit identical, adjacent and angularly offset like mold segments to couple in operative and functional alignment.

6. A vacuum thermoforming mold extending longitudinally about a central axis and operative with a plastic film to reshape and perforate said film, wherein the improvement comprises:
a plurality of identical mold segments, each one of said plurality of identical mold segments offset relative to a central axis from adjacent ones of said plurality of identical mold segments and coupled therewith to form a molding face which defines at least one portion of a three-dimensional exterior surface about said mold; and
spaces between adjacent ones of said plurality of identical mold segments that define at least one vacuum port passing through said mold to said molding face.

7. The vacuum thermoforming mold of claim 6 wherein each one of said plurality of identical mold segments further comprises:
a first major surface forming a first face;
a second major surface generally parallel to said first major planar surface and forming a second face opposed to said first face;
at least one minor surface bounding said first and second faces;
a first plurality of teeth extending normal to said first major planar surface;
a second plurality of teeth extending normal to said second major planar surface;
at least two vacuum conduits passing between said first and second major planar surfaces; and
a plurality of vacuum channels interspersed with said first and second plurality of teeth, each of said plurality of vacuum channels coupling at least one of said vacuum conduits to said at least one minor surface.

8. The vacuum thermoforming mold of claim 6 wherein said molding face defines a general circumference about said central axis and forms a roll thereabout.

9. The vacuum thermoforming mold of claim 8 wherein said offset relative to a central axis is an angular offset about said central axis.

10. The vacuum thermoforming mold of claim 8 wherein said vacuum port intersects with said molding face perpendicular to a line extending radially from said central axis to said general circumference.

11. A mold operative in combination with a vacuum and a generally planar plastic film to reshape said generally planar plastic film into a three-dimensional structure, said generally planar plastic film having a substantial height relative to a thickness and a substantial width relative to said thickness and defining an initial elevation at a first major surface of said generally planar plastic film prior to said reshaping, said mold comprising:
at least two ridges operative to restrain a first portion of said film first major surface at said initial elevation;
at least one valley interposed between a pair of said at least two ridges and operative to limit a second portion of said film first surface to at least one additional elevation displaced from said initial elevation;
at least one side wall extending between said at least two ridges and said at least one valley and defining a side wall surface therebetween; and
a vacuum port penetrating said side wall surface and operative to couple said vacuum between said at least one valley, said at least one side wall, said at least two ridges and said generally planar plastic film.

12. The mold operative in combination with a vacuum and a generally planar plastic film of claim 11, wherein said mold further comprises at least two segments and said vacuum port is comprised by a void between said at least two segments.

13. The mold operative in combination with a vacuum and a generally planar plastic film of claim 12, wherein said vacuum port is further comprised by a groove in a major surface of at least one of said at least two mold segments.

14. The mold operative in combination with a vacuum and a generally planar plastic film of claim 11, wherein said vacuum port penetrates said at least one side wall immediately adjacent to said at least one valley.

15. The mold operative in combination with a vacuum and a generally planar plastic film of claim 11, wherein said vacuum port has internal side walls that are generally perpendicular to said side wall surface adjacent to said side wall surface.

16. The mold operative in combination with a vacuum and a generally planar plastic film of claim 11, wherein said vacuum port has a rectangular shape at the intersection with said at least one side wall.

17. The vacuum thermoforming mold of claim 6 further comprising a roll core; and
wherein each one of said plurality of identical mold segments further comprises a means to securely engage said mold segment with said roll core.

18. The vacuum thermoforming mold of claim 17 wherein said means to securely engage said mold segment with said roll core further comprises an interference fit therebetween.

* * * * *